(12) United States Patent
Lee (10) Patent No.: US 10,900,717 B2
(45) Date of Patent: Jan. 26, 2021

(54) HEAT EXCHANGER MODULE UNIT

(71) Applicant: SPX FLOW TECHNOLOGY KOREA CO., LTD., Busan (KR)

(72) Inventor: Byeong-Seung Lee, Haeundae-gu Busan (KR)

(73) Assignee: SPX Flow Technology Korea Co., Ltd., Busan (KR)

( * ) Notice: Subject to any disclaimer, the term of this patent is extended or adjusted under 35 U.S.C. 154(b) by 71 days.

(21) Appl. No.: 15/748,093

(22) PCT Filed: Sep. 24, 2015

(86) PCT No.: PCT/KR2015/010068
§ 371 (c)(1),
(2) Date: Jan. 26, 2018

(87) PCT Pub. No.: WO2017/018594
PCT Pub. Date: Feb. 2, 2017

(65) Prior Publication Data
US 2018/0224213 A1   Aug. 9, 2018

(30) Foreign Application Priority Data

Jul. 27, 2015 (KR) ........................ 10-2015-0106055

(51) Int. Cl.
*F28D 15/02* (2006.01)
*F28D 20/02* (2006.01)
(Continued)

(52) U.S. Cl.
CPC ....... *F28D 15/0233* (2013.01); *B01D 53/265* (2013.01); *F04B 39/16* (2013.01);
(Continued)

(58) Field of Classification Search
CPC .. F28D 9/0043; F28D 9/005; F28D 2020/013; F28D 2020/0013; F28D 9/0031;
(Continued)

(56) References Cited

U.S. PATENT DOCUMENTS 5,810,071 A * 9/1998 Pavlin .................... F01M 5/002
165/284
7,134,483 B2 * 11/2006 Barnwell ............. B01D 53/265
165/11.1
(Continued)

FOREIGN PATENT DOCUMENTS

CN   101529194 A   9/2009
CN   102374705 A   3/2012
(Continued)

OTHER PUBLICATIONS

Office Action issued in Japanese Application No. 2018-525326, dated May 7, 2019.
(Continued)

*Primary Examiner* — Jianying C Atkisson
*Assistant Examiner* — Jose O Class-Quinones
(74) *Attorney, Agent, or Firm* — BakerHostetler (57) ABSTRACT

A heat exchanger module unit that provides heat exchange between a fluid and a heat medium by indirect heat exchange through a phase-change material disposed between movement paths of the fluid and the heat medium movement paths, includes: a multiple number of plates having a partition, which is formed with a through-hole through which the fluid and the heat medium move, are stacked with a spacing gap, through which the fluid and the heat medium move, at one side of the partition; the spacing gaps are selectively connected through a connector connecting the respective through-holes so as to form a fluid passage and a heat medium passage through which the fluid and the heat
(Continued)

medium move independently respectively; the spacing gap, in which the phase-change material is received, is located and disposed between the spacing gaps forming the fluid passage and the heat medium passage through which the fluid and the heat medium move respectively such that heat exchange is made between the fluid and the heat medium through the phase-change material. One of the fluid and the heat medium is disposed at one side of the phase-change material and another phase-change material is disposed at the opposite side thereof.

4 Claims, 11 Drawing Sheets (51) Int. Cl.
| | | |
|---|---|---|
| F28F 3/02 | (2006.01) | |
| B01D 53/26 | (2006.01) | |
| F04B 39/16 | (2006.01) | |
| F28D 9/00 | (2006.01) | |
| F28D 19/00 | (2006.01) | |
| F28D 21/00 | (2006.01) | |
| F28D 20/00 | (2006.01) | |
| F28D 1/03 | (2006.01) | |

(52) U.S. Cl.
CPC ............ *F28D 9/005* (2013.01); *F28D 19/00* (2013.01); *F28D 20/02* (2013.01); *F28D 20/021* (2013.01); *F28D 21/00* (2013.01); *F28F 3/02* (2013.01); *F28F 3/025* (2013.01); *F28D 1/0325* (2013.01); *F28D 9/0075* (2013.01); *F28D 2020/0013* (2013.01); *F28D 2021/0038* (2013.01); *Y02E 60/14* (2013.01)

(58) Field of Classification Search
CPC ........ F28D 9/0037; F28D 9/00; F28D 9/0093; F28D 3/08; F28D 3/083; F28D 3/086; F28D 3/10
USPC .................................................... 165/10, 167
See application file for complete search history.

(56) References Cited

U.S. PATENT DOCUMENTS

| | | | |
|---|---|---|---|
| 7,424,908 B2 * | 9/2008 | Blomgren | F28D 9/005 165/167 |
| 2006/0196632 A1 * | 9/2006 | Kudo | F28D 20/02 165/10 |
| 2009/0236071 A1 | 9/2009 | Jensen | |
| 2010/0157525 A1 | 6/2010 | Ullman et al. | |
| 2010/0307180 A1 * | 12/2010 | Yamada | F25D 17/005 62/285 |
| 2010/0319893 A1 | 12/2010 | Tsubone et al. | |
| 2011/0239696 A1 * | 10/2011 | Takagi | B60H 1/00335 62/524 |
| 2012/0042687 A1 * | 2/2012 | Kamoshida | F25B 39/02 62/524 |
| 2013/0047663 A1 * | 2/2013 | Kamoshida | F25B 39/02 62/524 |
| 2014/0069136 A1 * | 3/2014 | Lim | B60H 1/005 62/434 |
| 2014/0083662 A1 * | 3/2014 | Yamada | F25D 19/00 165/169 |

FOREIGN PATENT DOCUMENTS

| | | |
|---|---|---|
| CN | 103954159 A | 7/2014 |
| CN | 104236348 A | 12/2014 |
| FR | 3014183 A1 | 6/2015 |
| JP | 2006-029767 A | 2/2006 |
| JP | 2008106971 A | 5/2008 |
| JP | 2010-091250 A | 4/2010 |
| JP | 2012-220102 A | 11/2012 |
| JP | 2014-181825 A | 9/2014 |
| JP | 2015117917 A | 6/2015 |
| KR | 10-2012-0067406 A | 6/2012 |
| KR | 10-1188226 B1 | 9/2012 |
| KR | 10-1209342 B1 | 11/2012 |
| KR | 10-1251329 B1 | 4/2013 |
| TW | 200519343 A | 6/2005 |

OTHER PUBLICATIONS

Extended Search Report issued in European Application No. 15899738.7, dated Mar. 25, 2019.
Office Action received for Chinese Patent Application No. 201580081964.6, dated Jan. 6, 2020, 12 pages (6 pages of English Translation and 6 pages of Office Action).

* cited by examiner

HEAT EXCHANGER MODULE UNIT

CROSS-REFERENCE TO RELATED PATENT APPLICATIONS

The present application is a National Stage of International Patent Application No. PCT/KR2015/010068, filed Sep. 24, 2015, entitled "Heat Exchanger Module Unit" and claims the priority of Korean Patent Application No. 10-2015-0106055, filed on Jul. 27, 2015, the disclosures of which are incorporated herein by reference in their entirety.

TECHNICAL FIELD

The present disclosure relates to a heat exchanger module unit which constitutes a heat exchanger configured to exchange heat between a fluid and a heat medium by a single module unit or a plurality of connected module units. More particularly, the present disclosure relates to a heat exchanger module unit, which maximizes the entire energy usage efficiency as the fluid and a phase-change material make heat exchange therebetween by the latent heat stored in the phase-change material without continuous circulation of the heat medium. The foregoing is accomplished by disposing the phase-change material between the movement paths of the fluid and the heat medium and performing heat exchange between the fluid and the heat medium by indirection heat exchange through the phase-change material. This allows for stable functionality by avoiding direct spatial contact between the fluid and the heat medium in cases where the heat exchanger includes a plurality of the connected module units.

BACKGROUND

In general, a heat exchanger is configured to absorb or heat the heat energy of a fluid for a desired purpose by heat exchange between the fluid and a heat medium through heat contact therebetween while the heat medium is circulated by a circulation cycle.

Such a heat exchanger is applied to various fields. By way of an example of the various fields, the heat exchanger is applied to and used for a refrigerated air dryer which cools and then condenses moisture contained in the compressed air (or exhaust gas) and thereafter removes the moisture.

Such an air dryer dries the fluid by cooling the fluid (compressed air or exhaust gas) through a cold heat medium (refrigerant) on a movement path of the fluid to condense the moisture contained therein, and thereafter removing the same.

That is, the air dryer makes dry air by cooling the compressed air in the heat exchanger with the refrigerant, and then drains and removes condensed water vapor in the compressed air through a separator.

At this time, before the low-temperature dry air, from which the condensed water has been removed, is discharged, the low-temperature dry air may be warmed up through additional heat exchange with wet air within a separate heat exchange space such that the relative humidity is lowered and the degree of dryness is further increased. Further, since a high-temperature inlet air can be pre-cooled, it is possible to apply a configuration for reducing the refrigeration load of an evaporator constituting a refrigerant cooling circulation system.

The aforementioned air dryer is configured to make heat exchange with the fluid in the state where it is continuously cooled through the refrigerant cooling circulation system. Thus, there is a problem since it is difficult to adjust temperature through an on/off control of the refrigerant cooling circulation system due to the load characteristic of the air dryer which frequently varies from 0% to 100%.

Therefore, in the prior art, the temperature is adjusted by bypassing the refrigerant when necessary while the refrigerant cooling circulation system always operates.

However, in such a case, the refrigerant cooling circulation system always operates irrespective of the load value depending upon the load characteristic of the air dryer. Therefore, there is a problem since the energy usage efficiency remarkably deteriorates.

To solve the aforementioned problems of the prior art, there has been proposed and used an air dryer which is configured to adjust temperature through the on/off control of the refrigerant cooling circulation system by an indirect cooling method using a cold storage tank and a pump. In such a case, the cold storage tank must have a large size because heat exchange with the fluid is made using the sensible heat of glycol, and a separate pump must be provided to circulate the refrigerant to the heat exchanger where the heat exchange is made. Therefore, there is a problem since the cost increases.

SUMMARY

The present disclosure includes embodiments that solve the aforementioned problems of the prior art. One embodiment includes a heat exchanger module unit, which can constitute a heat exchanger configured to make heat exchange between a fluid and a heat medium by a single module unit or a plurality of connected module units, which can maximize the entire energy usage efficiency as the fluid and a phase-change material make heat exchange therebetween by the latent heat stored in the phase-change material without continuous circulation of the heat medium. The foregoing is accomplished by disposing the phase-change material between the movement paths of the fluid and the heat medium and performing heat exchange between the fluid and the heat medium by indirect heat exchange through the phase-change material. This allows for stable functionality by avoiding direct spatial contact between the fluid and the heat medium when, in particular, the heat exchanger includes a plurality of the connected module units.

Another embodiment includes a heat exchanger module unit configured to constitute a heat exchanger, which is, in particular, applied to an air dryer. In this embodiment, the heat exchange of the fluid is realized without a separate cold storage tank and pump by maximizing a cold storage effect using the latent heat of the phase-change material, which is melted by absorbing heat or is frozen by emitting heat. This embodiment, when applied to an air dryer, operates at a lower cost than a general indirect cooling type air dryer, and which, due to a cold storage capacity greater than the conventional indirect cooling-type air dryer, dramatically improves the durability, by improving the frequent on/off control which deteriorates the durability of the refrigerant cooling circulation system.

A heat exchanger module unit of one embodiment of the present disclosure, which accomplishes the above, is characterized in that: a multiple number of plates having a partition formed with a through-hole through which a fluid and a heat medium move are stacked with a spacing gap, through which the fluid and the heat medium move, at one side of the partition; a connector configured to connect the respective through-holes selectively connects the spacing gaps to form a fluid passage and a heat medium passage through which the fluid and the heat medium move independently respectively; the spacing gap in which a phase-change material is received is located and disposed between the spacing gaps which form the fluid passage and the heat medium passage through which the fluid and the heat medium move respectively; heat exchange is made between the fluid and the heat medium through the phase-change material; and one of the fluid and the heat medium is arranged at one side of the phase-change material and another phase-change material is arranged at the opposite side of the phase-change material.

The heat exchanger module unit of an embodiment of the present disclosure is characterized in that the phase-change material is received in at least one spacing gap from the outermost spacing gap among the spacing gaps of the plates.

The heat exchanger module unit of an embodiment of the present disclosure is characterized in that the phase-change material is made of paraffin.

The heat exchanger module unit of an embodiment of the present disclosure is characterized in that the partition, which forms two rows of the spacing gaps where the phase-change material is consecutively disposed, is formed with a passage hole which allows the phase-change material to pass therethrough and to be interchanged with each other.

According to a heat exchanger module unit having the above-described configuration, a multiple number of the plates are stacked while forming passages through which the fluid and the heat medium move with the phase-change materials provided therebetween, and thus the heat exchange between the fluid and the heat medium is indirectly made by the latent heat of the phase-change material. Accordingly, the heat exchanger module unit of the present disclosure has an effect of maximizing the entire energy usage efficiency since the heat exchange between the fluid and the phase-change material is performed through the latent heat stored in the phase-change material without continuous circulation of the heat medium.

When being applied to an air dryer in particular, the heat exchanger module unit of the present disclosure effectively realizes the heat exchange of the fluid without a separate cold storage tank and pump by maximizing a cold storage effect using the latent heat of the phase-change material and is operated at a lower cost than the indirect cooling type air dryer of the prior art, and has a cold storage capacity greater than the indirect cooling-type air dryer of the prior art, improving the frequent on/off control which deteriorates the durability of the refrigerant cooling circulation system. Thus, the heat exchanger module unit of the present disclosure has an effect of dramatically improving the durability.

Furthermore, when a plurality of the heat exchanger module units are connected in series to constitute the heat exchanger, the fluid and the heat medium are prevented from directly coming into close contact with each other since at least one phase-change material is located in the spacing gaps forming the connection portions between the module units. Accordingly, the heat exchanger module unit of the present disclosure has an effect of preventing deterioration of the heat exchange efficiency when the module units are coupled, and stably performing the function thereof

DETAILED DESCRIPTION

Detailed descriptions are made below as to a heat exchanger module unit according to preferred embodiments of the present disclosure with reference to the accompanying drawings.

The embodiments of the present disclosure may be modified in various forms and the scope of the present disclosure should not be construed as being limited to the embodiments described in detail below. The present embodiments are provided so as to more fully provide an explanation to one of ordinary skill in the art. Therefore, the shapes and the like of the elements shown in the drawings may be exaggerated for purposes of clearer explanation. It should be noted that the same members are denoted by the same reference numerals in the drawings. Detailed descriptions of well-known functions and configurations that may unnecessarily obscure the subject matter of the present disclosure will be omitted.

FIGS. 1 to 8 show a heat exchanger module unit according to an embodiment of the present disclosure. A single heat exchanger module unit 1 according to the present embodiment or a plurality of heat exchanger module units 1 connected in series according to the present embodiment constitute a heat exchanger 10 and is configured to make heat exchange in a space where a fluid and a heat medium move. The heat exchanger module unit 1 is particularly and suitably applied to an air dryer 100 which dries air by transferring heat from the fluid (compressed air or exhaust gas) mainly containing moisture to a cold heat medium and removing the moisture through condensation of the moisture.

That is, since the cold heat medium (refrigerant) absorbs heat of the fluid (compressed air or exhaust gas) through the heat exchange made between the cold heat medium and the fluid, and the moisture is thereby condensed, the air is dried.

In some embodiments, the cold heat medium (refrigerant) is cooled and then re-circulated by a separate cooling circulation system, to which well-known techniques are applied, and the cold heat medium performs heat exchange through thermal contact with the continuously inputted fluid.

In such a heat exchanger module unit 1 of the present embodiment, a multiple number of plates 2, which have a partition 22 formed with a plurality of through-holes 21 through which the fluid and the heat medium move, are stacked with a spacing gap 23, through which the fluid and the heat medium move, at one side of the partition 22.

That is, the plates 2 are fitted together with the spacing gaps 23, and the spacing gaps 23 are connected through the through-holes 21.

Therefore, the fluid and the heat medium move via the spacing gaps 23.

Figure 6:
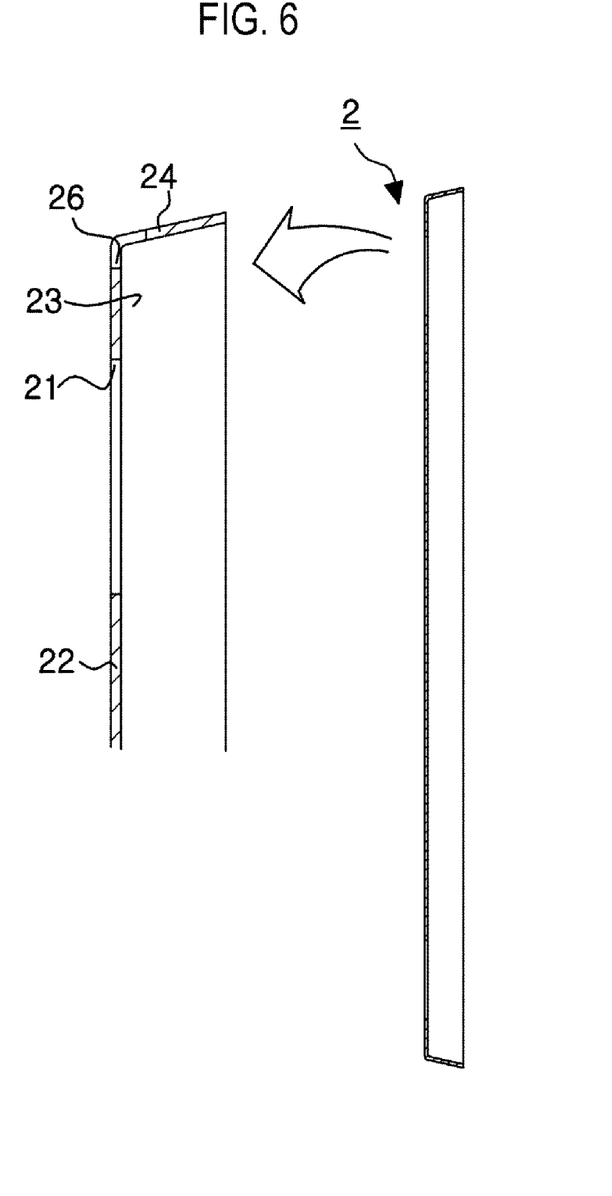
FIGS. 6 to 8 are schematic views showing an example of a plate constituting a heat exchanger module unit according to the present embodiment.
Figure 7:
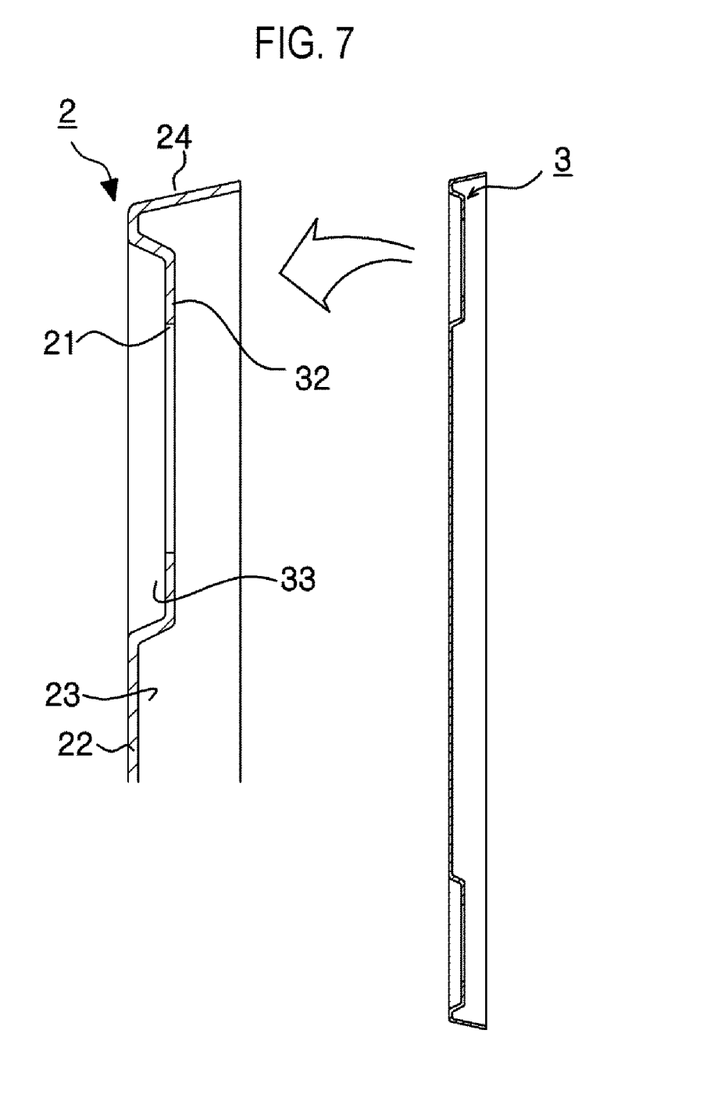
Figure 8:
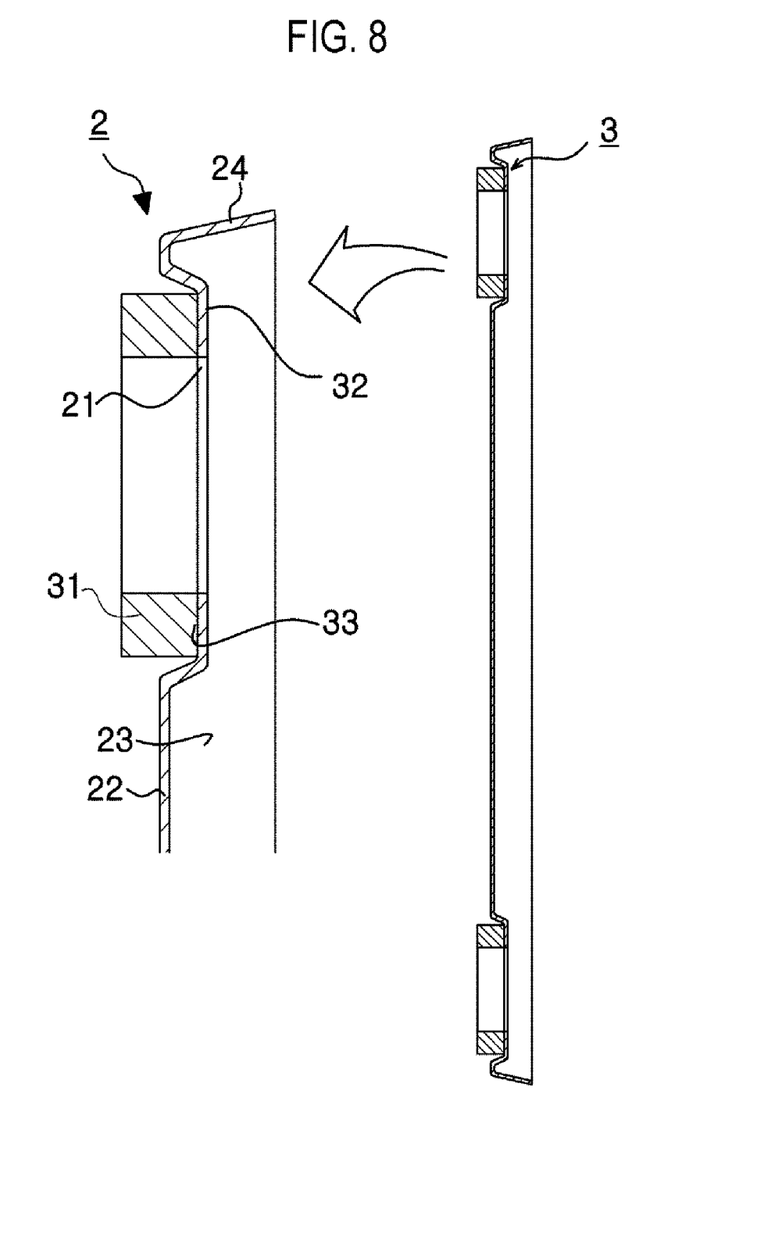

The plate 2 is configured to include the partition 22 and a side wall 24, which extends from an outer peripheral surface of the partition 22 in a direction of the spacing gap 23. The spacing gap 23 is formed in a space between the partition 22 and the side wall 24.

In some embodiments, the side wall 24 is configured with an inclined surface inclined outwardly toward the end thereof so that the fitting of the plates 2 can be easily made when a multiple number of the plates 2 are stacked.

The through-holes 21 are formed at the upper, lower, right, and left corners of the partition 22, respectively. In some embodiments, the fluid and the heat medium move through the upper and lower through-holes 21. In some embodiments, the through-holes 21 formed at the left side and right side are configured such that the fluid and the heat medium move through respective independent spaces.

The heat exchanger module unit 1 having the above-described configuration according to the present embodiment is configured such that the spacing gaps 23 are selectively connected by a connector 3 connecting the respective through-holes 21 to form a fluid passage 41 and a heat medium passage 42 through which the fluid and the heat medium move respectively and independently.

That is, the selected through-holes 21 are connected by the connector 3 and the through-holes 21 and the spacing gaps are spatially separated by the connector 3. Therefore, the selected through-hole 21 and the selected spacing gaps 23 communicate with each other, thereby forming the fluid passage 41 and the heat medium passage 42.

Therefore, the fluid passage 41 and the heat medium passage 42 may be formed by connecting only the spacing gaps 23 which are located at the selected position among the arranged spacing gaps 23.

Thus, the fluid passage 41 and the heat medium passage 42 can be formed in a zigzag form or can be formed so as to face each other, thereby structurally enhancing the heat exchange efficiency.

The connector 3 includes a connection ring 31 having a ring shape, and is thus configured to connect the through-holes 21 while sealing the through-hole from the outside. The partition 22 includes an extension protrusion 32, which extends toward and comes into close contact with the adjacent partition 22 constituting an adjacent plate in the vicinity of the through-hole 21, and is thus configured to connect the through-holes 21 while sealing the through-hole from the outside.

In some embodiments, the connection ring 31 having a ring shape is configured such that it is received in a receiving recess 33 of the extension protrusion 32, which includes the receiving recess 33 recessed toward the partition 22 constituting the adjacent plate 2 in the vicinity of the through-hole 21. In other embodiments, a protruding surface of the extension protrusion 32 is configured to come into close contact with a peripheral surface of the through-hole 21 of the partition 22 constituting the adjacent plate 2.

Further, in some embodiments, a multiple number of corrugations 25 are formed in the partition 22 to increase the contact area between the moving fluid and heat medium and the partition 22, thereby enhancing the heat exchange efficiency. In other embodiments, the corrugations 25 are formed to have an inclination angle from the center of the partition 22 gradually toward both ends thereof and a central portion thereof forms a vertex in the movement direction of the fluid and the heat medium.

Therefore, the heat exchange area of the fluid and the heat medium, which move through the spacing gaps 23, is efficiently increased and the heat exchange efficiency is thereby enhanced. Also, the contact area between the moving fluid and heat medium and the partition 22 is increased, and the condensation area of the moisture contained in a target air is effectively thereby increased.

Thus, the drying efficiency of the air is enhanced.

In the heat exchanger module unit 1 having the above-described configuration according to the present embodiment, the spacing gap 23, in which a phase-change material 5 is received, is located and disposed between the spacing gaps 23 which form the fluid passage 41 and the heat medium passage 42. Thus, the heat exchanger module unit is configured such that heat exchange is made between the fluid and the heat medium through the phase-change material 5.

That is, the phase-change material 5 is disposed between the heat medium (refrigerant) and the fluid (compressed air or exhaust gas), preventing direct heat exchange and allowing indirect heat exchange through the phase-change material 5. Thus, the fluid and the phase-change material 5 make heat exchange therebetween by the latent heat stored in the phase-change material 5 without continuous circulation of the heat medium, thus maximizing the entire energy usage efficiency.

Particularly, in the case of where the heat exchanger module unit is applied to the air dryer 100, the heat exchange of the fluid is effectively realized without a separate cold storage tank and pump by maximizing a cold storage effect using the latent heat of the phase-change material 5. Thus, the air dryer can operate at a lower cost than the indirect cooling type air dryer of the prior art. Further, the air dryer has a cold storage capacity greater than the indirect cooling-type air dryer of the prior art, and the frequent on/off control, which deteriorates the durability of the refrigerant cooling circulation system, is improved thereby. Thus, the durability can be dramatically improved.

In some embodiments, the phase-change material 5 is made of paraffin. In some embodiments, the plate 2, which forms the spacing gap 23 receiving the phase-change material 5 therein, is formed with an injection hole 26 through which the phase-change material 5 is injected.

In the heat exchanger module unit 1 having the above-described configuration according to the present embodiment, one of the fluid and the heat medium is arranged at one side of the phase-change material 5 and another phase-change material 5 is arranged at the opposite side thereof.

Therefore, the respective phase-change materials 5 neighboring with the respective fluid and heat medium perform heat exchange. Thus, the thermal interchange between the fluid and the heat medium is indirectly performed through the heat exchange made between the phase-change materials 5.

Accordingly, the heat filling of the phase-change material 5 is more stably performed, and the heat exchange between the fluid and the phase-change material 5 is made by the latent heat stored in the phase-change material 5 without the continuous circulation of the heat medium. Thus, the entire energy usage efficiency is maximized.

Figure 9:
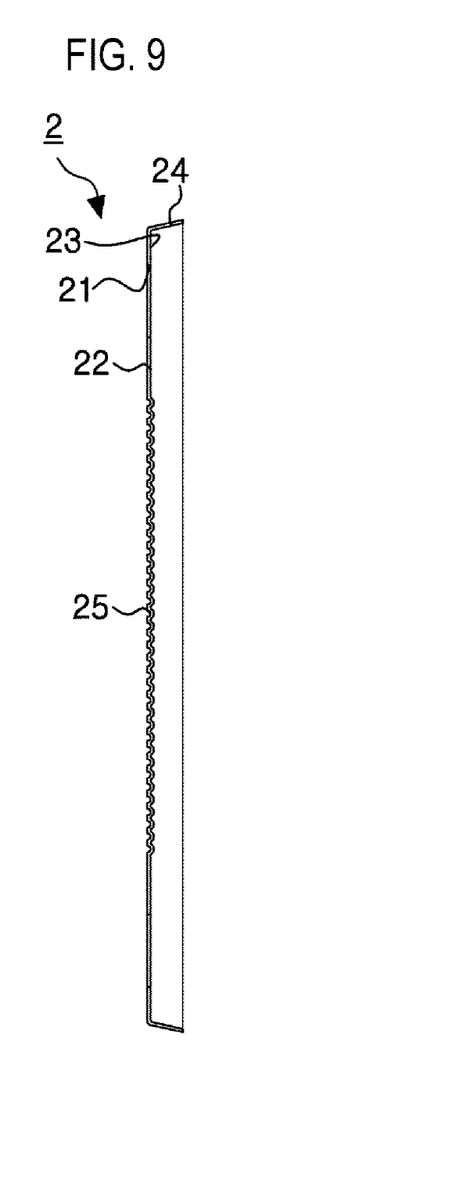
FIG. 9 is a schematic view showing another example of a plate constituting a heat exchanger module unit according to the present embodiment.
Figure 10:
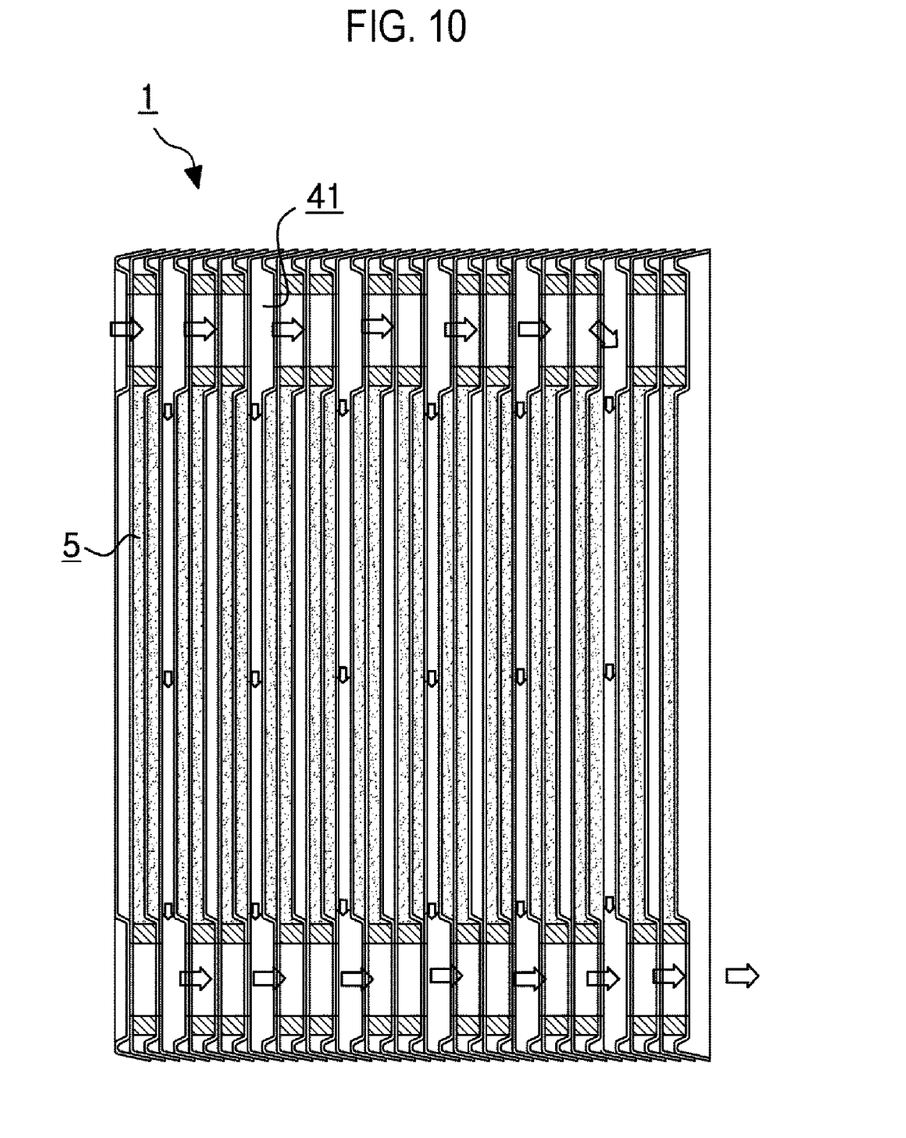
FIG. 10 is a schematic view showing the state where a fluid moves in a heat exchanger module unit according to the present embodiment.
Figure 11:
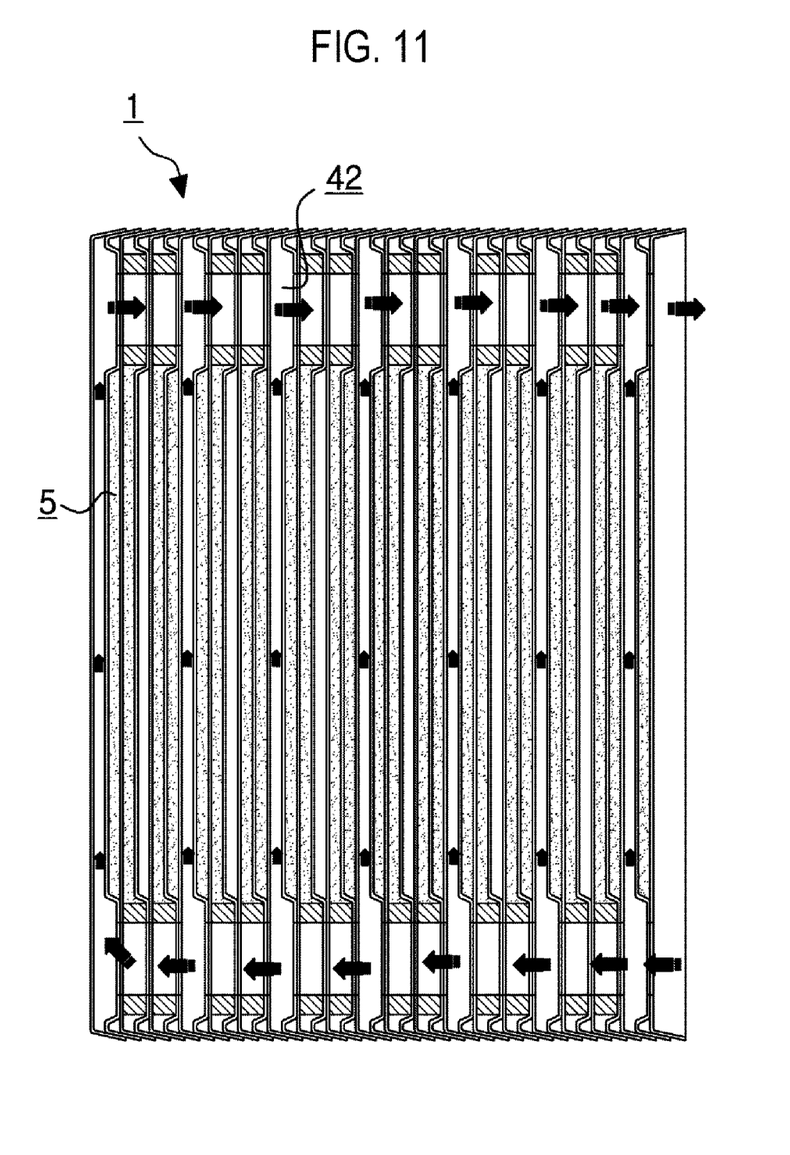
FIG. 11 is a schematic view showing the state where a heat medium moves in a heat exchanger module unit according to the present embodiment.

In some embodiments, the partition 22, which forms two rows of the spacing gaps 23 where the phase-change materials 5 are consecutively disposed, is formed with passage holes 27 which allow the phase-change materials 5 to pass therethrough and to be interchanged with each other.

Therefore, in some embodiments, the phase-change materials 5 are smoothly interchanged with each other through the passage holes 27 and the heat exchange is more smoothly made.

In the heat exchanger module unit 1 having the above-described configuration according to the present embodiment, the phase-change material 5 is received in at least one spacing gap 23 from the outermost spacing gap 23 among the spacing gaps 23 of the plates 2.

Figure 5:
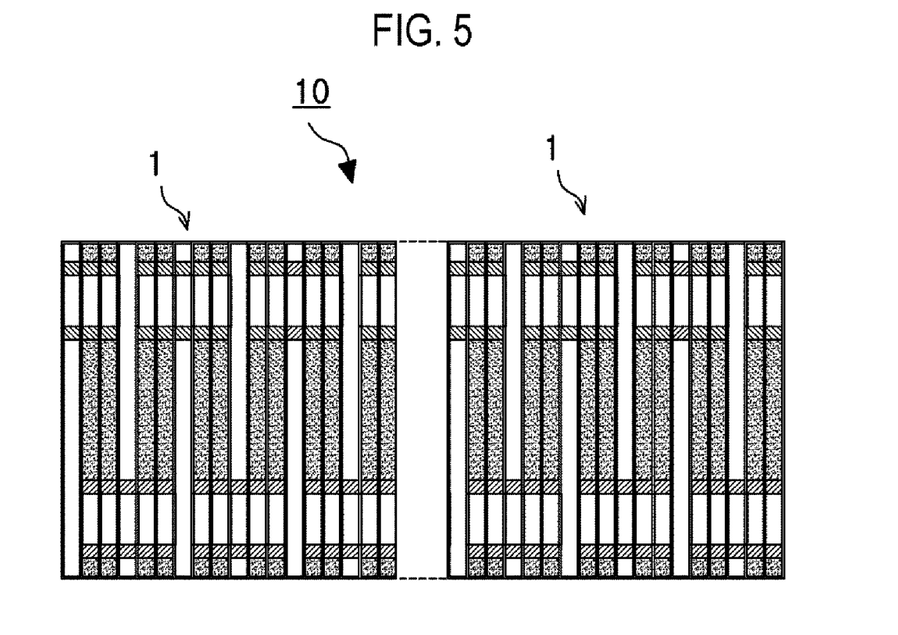
FIG. 5 is a schematic view showing a heat exchanger to which a heat exchanger module unit according to the present embodiment is applied.

Therefore, when a plurality of the heat exchanger module units are connected in series to constitute the heat exchanger 10, at least one phase-change material 5 is located in the spacing gaps 23 forming the connection portions between the module units 1. Thus, the fluid and the heat medium are prevented from directly coming into close contact with each other, thereby preventing deterioration of the heat exchange efficiency when the module units are coupled, and stably performing the function thereof.

Reference numeral 6, which is not described above, indicates a separator, and reference numeral 61, which is not described above, indicates an oil filter.

Detailed descriptions are made below as to the operational effects of the heat exchanger module unit having the above-described configuration according to the present embodiment.

Figure 1:
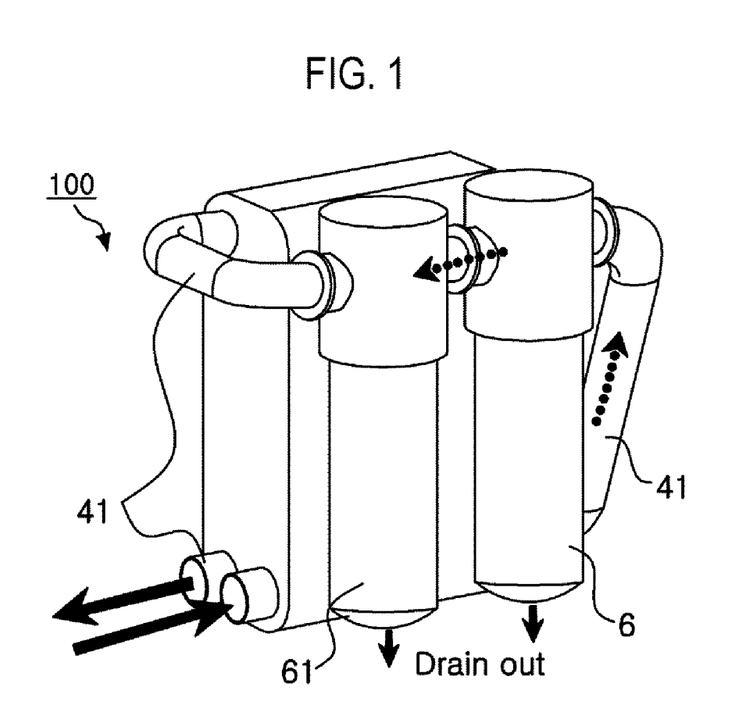
FIGS. 1 and 2 are schematic perspective views showing an example of an air dryer using a heat exchanger to which a heat exchanger module unit according to an embodiment of the present disclosure is applied.
Figure 2:
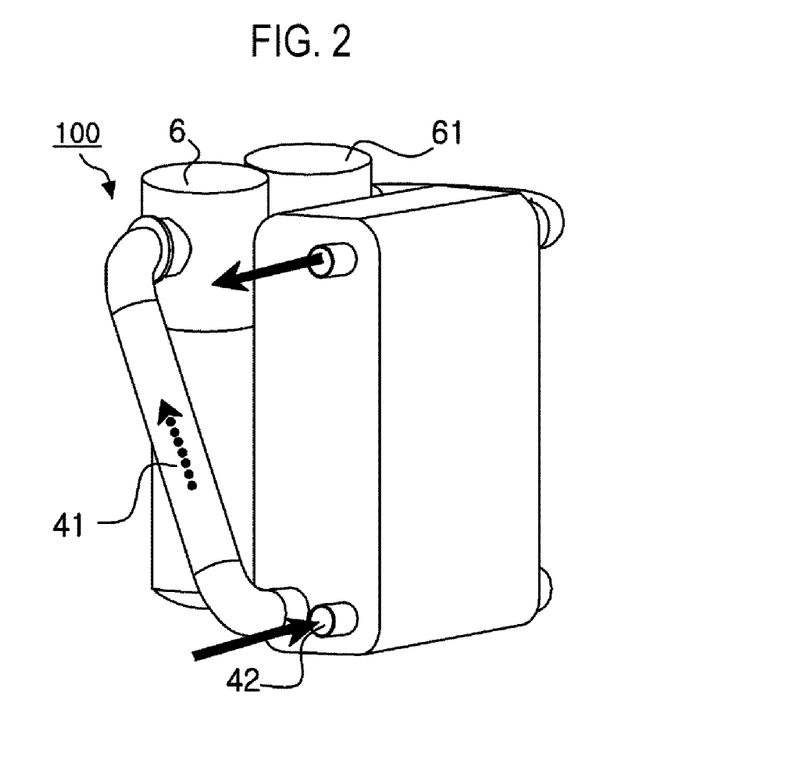
Figure 3:
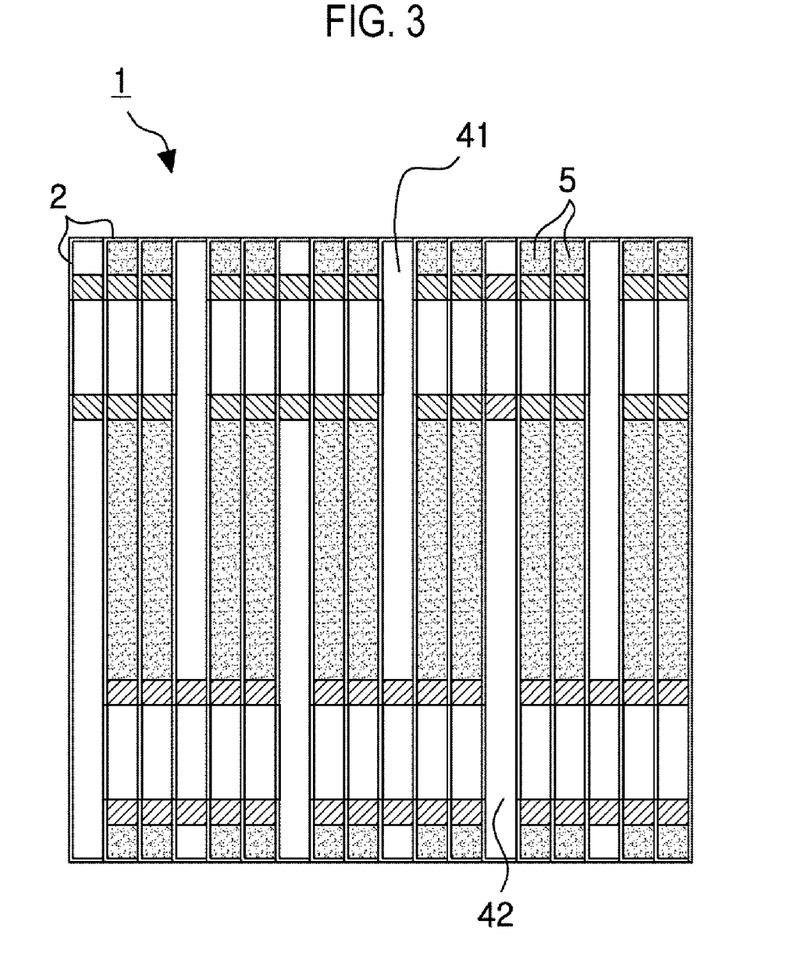
FIGS. 3 and 4 are schematic views showing a heat exchanger module unit according to the present embodiment.
Figure 4:
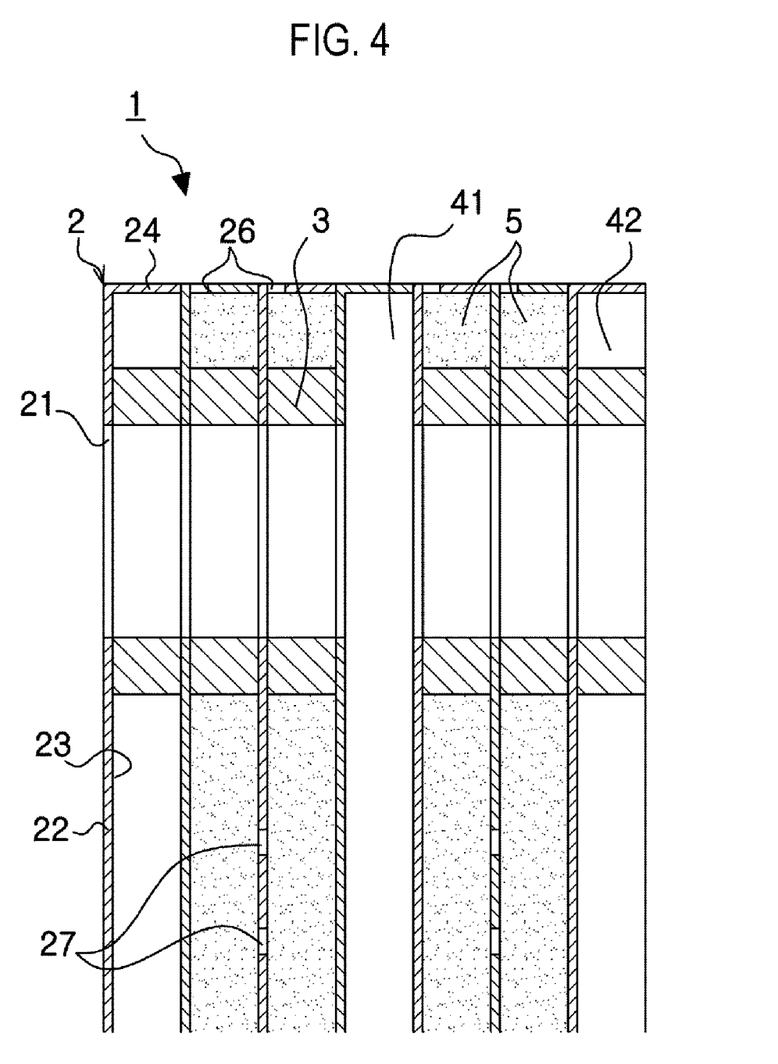

As shown in FIGS. 1 and 2, the heat exchanger module unit 1 according to the present embodiment is configured to constitute the heat exchanger 10 which is applied to the air dryer 100 removing moisture contained in target air (compressed air or exhaust gas) by mainly absorbing heat of the target air. In the heat exchanger module unit, the phase-change material 5 is disposed between the fluid passage 41, through which the fluid (target air) moves, and the heat medium passage 42, through which the cold heat medium (refrigerant) moves. Thus, the heat of the fluid (target air) is absorbed while the heat exchange is not made rapidly, but is made indirectly through the phase-change material 5.

Therefore, the moisture contained in the fluid (target air) is condensed and thereafter is drained out and removed through the separately-provided separator 6, thereby drying the fluid.

According to the heat exchanger module unit 1 of the present embodiment as described above, when a single heat exchanger module unit or a plurality of heat exchanger module units connected in series constitute the heat exchanger 10 configured to make heat exchange between the fluid and the heat medium, a multiple number of the plates 2 are stacked with the spacing gaps 23 which form the fluid passages 41 and the heat medium passages 42, through which the fluid and the heat medium move, as the phase-change materials 5 are provided therebetween. Thus, the technical configuration of the heat exchanger module unit according to the present embodiment is characterized in that the heat exchange between the fluid and the heat medium is made through the phase-change materials 5 and the entire energy usage efficiency is maximized thereby.

One embodiment of the present disclosure described hereinbefore is only illustrative. It will be apparent to those of ordinary skilled in the technical field to which the present disclosure pertains, that various modifications and other equivalent embodiments may be made from the above-described embodiments. Accordingly, it can be understood that the present disclosure is not limited to the embodiments described in the detailed description. Therefore, the true technical protection scope of the present disclosure should be determined by the technical ideas of the appended claims. Further, it should be understood that the present invention encompasses all modifications, equivalents, and alternatives falling within the scope of the invention defined by the appended claims.

INDUSTRIAL APPLICABILITY

The present disclosure relates to a module unit configured to make heat exchange between a fluid and a heat medium by means of a single module unit or a plurality of connected module units. A phase-change material is disposed between the movement paths of the fluid and the heat medium, and the heat exchange is performed between the fluid and the heat medium by indirect heat exchange through the phase-change material. Thus, some embodiments of the present disclosure can be applied to a heat exchanger which allows the fluid and the phase-change material to make heat exchange therebetween by the latent heat stored in the phase-change material without continuous circulation of the heat medium.

What is claimed is:
1. A heat exchanger module unit comprising:
a multiple number of plates, each of the multiple number of plates having a partition formed with a through-hole, through which a fluid and a heat medium move, each of the plates being stacked with a plurality of spacing gaps, through which the fluid and the heat medium move, at one side of the partition;
a connector configured to connect respective through-holes, the connector selectively connecting the spacing gaps of the plates through which the fluid and the heat medium move independently respectively; and
phase-change materials including a first phase-change material and a second phase-change material;
wherein the plurality of the spacing gaps is configured to include:
a fluid passage through which the fluid moves;
a heat medium passage through which the heat medium moves;
a first phase-change material gap in which the first phase-change material is received, the first phase-change material gap located adjacent to the fluid passage; and
a second phase-change material gap in which the second phase-change material is received, the second phase-change material gap located adjacent to the heat medium passage,
wherein the first and second phase-change material gaps are located between the fluid passage and the heat medium passage,
wherein heat exchange is indirectly made between the fluid and the heat medium through latent heat stored in the first and second phase-change materials,
wherein the connector includes a plurality of connection rings each configured to connect the through-hole formed in one partition of two adjacent partitions and the through-hole formed in the other partition of the two adjacent partitions and to seal the two through-holes from outside,
wherein one partition of the two adjacent partitions is configured to include a plurality of extension protrusions extending away from the other partition of the two adjacent partitions,
wherein a receiving recess in which a respective one of the plurality of connection rings is received is formed in each of the extension protrusions,
wherein the plurality of connection rings is disposed in the plurality of the spacing gaps, respectively, and wherein the plurality of connection rings includes:
- a first connection ring disposed in the first phase-change material gap and configured to seal the through-hole formed in one partition of two partitions located adjacent to each other to form the first phase-change material gap and the through-hole formed in the other partition of the two partitions from the first phase-change material; and
- a second connection ring disposed in the second phase-change material gap and configured to seal the through-hole formed in one partition of two partitions located adjacent to each other to form the second phase-change material gap and the through-hole formed in the other partition of the two partitions from the second phase-change material.

2. The heat exchanger module unit of claim 1, wherein the phase-change materials further include a third phase-change material which is received in at least one spacing gap from the outermost spacing gap among the spacing gaps of the plates.

3. The heat exchanger module unit of claim 1, wherein the partition, which forms two rows of the spacing gaps where the first and second phase-change materials are consecutively disposed, is formed with a passage hole which allows the first and second phase-change materials to pass therethrough and to be interchanged with each other.

4. The heat exchanger module unit of claim 1, wherein the phase-change materials are made of paraffin.

* * * * *